UNITED STATES PATENT OFFICE.

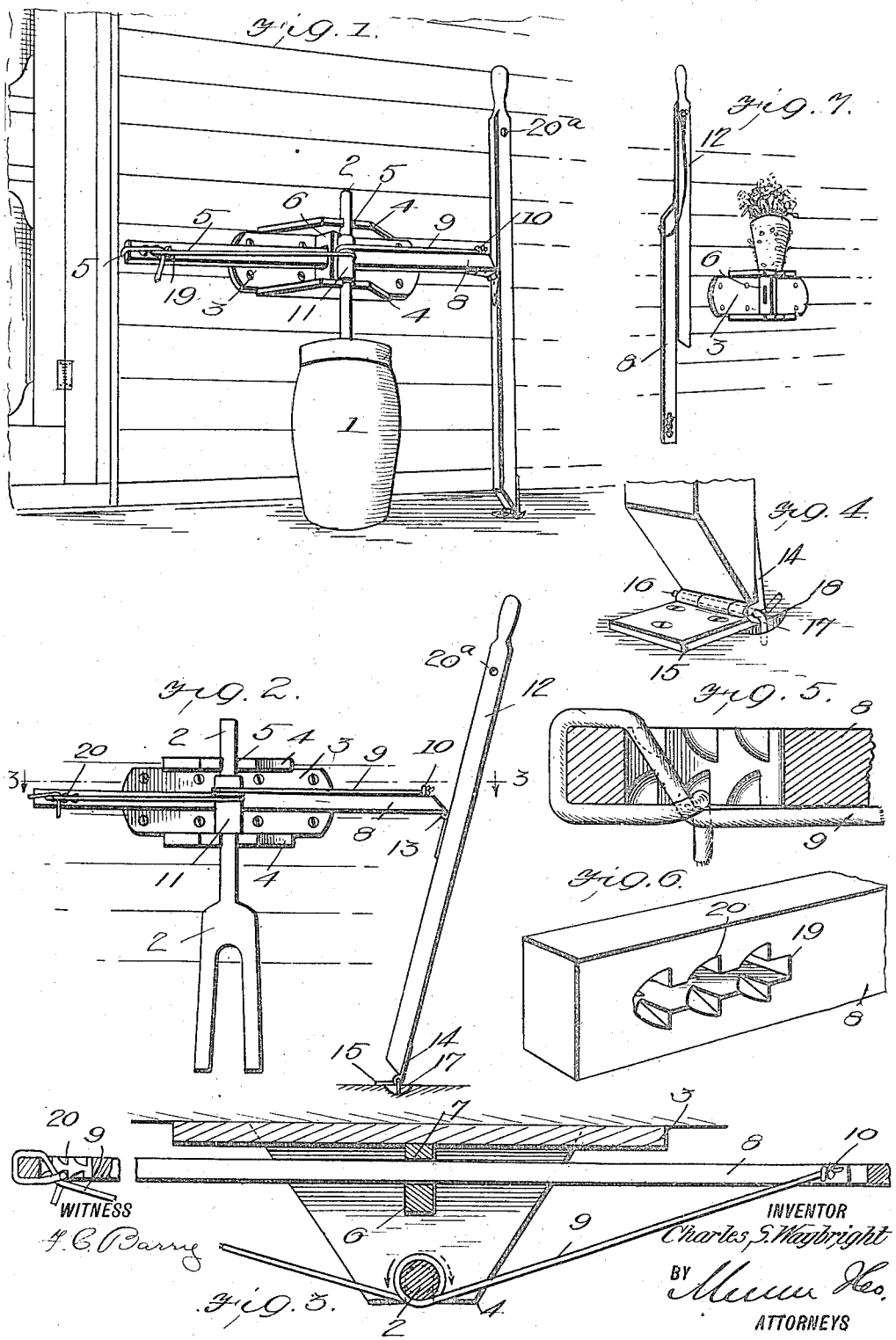

CHARLES S. WAYBRIGHT, OF STAUNTON, VIRGINIA.

CHURN-OPERATING MECHANISM.

1,247,352.  Specification of Letters Patent.  Patented Nov. 20, 1917.

Application filed June 29, 1917. Serial No. 177,682.

*To all whom it may concern:*

Be it known that I, CHARLES S. WAY-BRIGHT, a citizen of the United States, and a resident of Staunton, in the county of Augusta and State of Virginia, have invented new and useful Improvements in Churn-Operating Mechanism, of which the following is a specification.

My invention is an improvement in churn operating mechanism, and has for its object to provide a simple, efficient and inexpensive mechanism of the character specified, capable of use with any form of churn, and adapted for connection with a fixed support as, for instance, a wall or the like, and wherein a bracket is provided having open bearings for the dasher and a guide for a reciprocating bar, together with a cord adapted to encircle the dasher and connected at its ends to the bar to rotate the dasher when the bar is reciprocated, and a lever having at its lower end a separable hinge, one section of which is adapted for connection with the floor to permit the lever to be detached from the floor and to be suspended, together with the bar, in folded position, and wherein a special form of detachable connection is provided for one end of the cord to permit the easy detachment of the same from the bar and from the dasher.

In the drawings:

Figure 1 is a perspective view of the improved operating mechanism in operative position;

Fig. 2 is a front view with the dasher removed from the churn;

Fig. 3 is a section on the line 3—3 of Fig. 2, looking in the direction of the arrows adjacent the line;

Fig. 4 is a perspective view of the hinge connection for the lever;

Fig. 5 is a section on the line 5—5 of Fig. 1;

Fig. 6 is a perspective view of one end of the reciprocating bar;

Fig. 7 is a perspective view of the operating mechanism in inoperative position.

The present embodiment of the invention is shown in connection with a churn consisting of a vessel 1 and a dasher 2, which, in the present instance, is a staff having at one end a fork.

A suitable supporting bracket is provided, the said bracket comprising a body 3 which is adapted to be secured to a fixed support as, for instance, a wall, a door, a tree or the like, by means of screws as shown, and the body is provided at its upper and lower edges with outwardly extending bearing plates 4, which have notches 5 forming open bearings for receiving the body of the dasher.

The body of the support is also provided with a vertical bearing plate 6 at its center, and extending between the plates 4, and the said plate has an opening 7 through which a reciprocating bar 8 is adapted to extend. This bar has connected therewith a cord 9, one end of the cord being permanently attached to the bar, as indicated at 10, while the other end is detachably connected to the bar in a manner to be described. Intermediate its ends the cord 9 is wrapped about the body of the dasher, a complete turn or more, and it will be evident that when the bar is reciprocated the dasher will be rotated by the winding and unwinding of the cord upon the dasher. Preferably, the body of the dasher is enlarged, as indicated at 11, at the point where the cord engages the same, and this enlargement at its lower end provides an annular shoulder or stop which limits the downward movement of the dasher with respect to the bracket.

The bar is reciprocated by means of a lever 12, to which the bar is hinged at the end adjacent to the permanent connection of the cord and intermediate the ends of the lever by a hinge 13. At its lower end the lever has a hinge consisting of separable leaves 14 and 15, the leaf 14 being connected to the lever, while the leaf 15 is adapted to be connected to the floor, and the leaves are connected by a pintle 16 which is removable. This pintle has one end bent at an angle to the body of the pintle, as indicated at 17, and a notch or recess 18 is provided in the floor at one edge of the hinge for receiving this angular portion when the pintle is in place. Thus when the pintle is placed the angular end is permitted to drop down into the notch or recess to prevent displacement of the pintle. The detachable connection between the cord and the reciprocating bar 8 is shown more particularly in Figs. 5 and 6. As will be noticed, the bar 8 has at the end remote from the lever a longitudinally extending slot 19, and notches 20 are provided at the opposite sides of the slot and at each face of the bar, the said notches 20 having that wall adjacent to the permanent connection of the cord perpendicular to the plane of the slot, while the other wall is rounded. The end of the cord is passed through the slot, as shown in Fig. 5, and about the end of the bar and then beneath the cord, and the said end may be passed from above or below and may engage with either notch of the upper or lower series. The cord may also be engaged at either side of the bar, so that the lever may be arranged at either side of the churn to provide for right and left hand operators.

It will be noticed that that end of the bar adjacent the lever and that end of the lever adjacent to the hinge are beveled to permit the full movement of the lever and bar. The lever is also provided with an opening 20ª for engagement by a nail or the like to permit the lever and the bar to be hung up on the wall.

In use, the parts are arranged as shown in Fig. 1, and it will be evident that when the lever is vibrated the dasher will be rotated, thus producing the churning motion necessary to produce butter. After the churning operation is complete the cord is detached at the detachable connection, the pintle is removed, and when the lever is suspended the lever and the handle fold into the position shown in Fig. 7, where they occupy the least space. The churn and dasher are removed, and the supporting bracket forms a convenient shelf for other articles.

In the usual form of churn operating mechanism, the churn is placed upon a platform to which the operating mechanism is connected. With this arrangement, the vibration induced by the operating mechanism tends to displace the churn, and the dasher will displace the cover for the churn, or the parts will bind, so that the dasher cannot operate freely. With the present construction, however, the operating mechanism is independent of the churn, having no connection therewith, and, as a consequence, does not induce vibrations in the churn which tend to displace the same with respect to the operating mechanism.

The entire mechanism occupies but little room at any time, is easily set up and taken down and, while inexpensive and of simple construction, is very efficient for the purpose.

I claim:

Churn operating mechanism, comprising a bracket adapted to be secured to a fixed support and having upper and lower bearing plates having vertically alined open bearings for receiving the churn dasher, and a vertical lug having an opening for a reciprocating bar, a bar mounted to reciprocate in the opening and removable from the bracket, a cord connected permanently at one end of the bar and detachable at the other end and winding intermediate its ends upon the dasher, a lever having a hinge at its lower end composed of separable leaves and hinged to the reciprocating bar intermediate the ends of the lever, one of the said leaves being adapted to be permanently connected to a fixed support adjacent to the supporting bracket, said detachable connection of the cord comprising a longitudinally extending slot in the bar, and a series of notches at each side of the slot and at each face of the bar, each notch having that wall adjacent to the permanent connection perpendicular to the plane of the slot and the other wall rounded, for the purpose specified.

CHARLES S. WAYBRIGHT.

Copies of this patent may be obtained for five cents each, by addressing the "Commissioner of Patents, Washington, D. C."